UNITED STATES PATENT OFFICE.

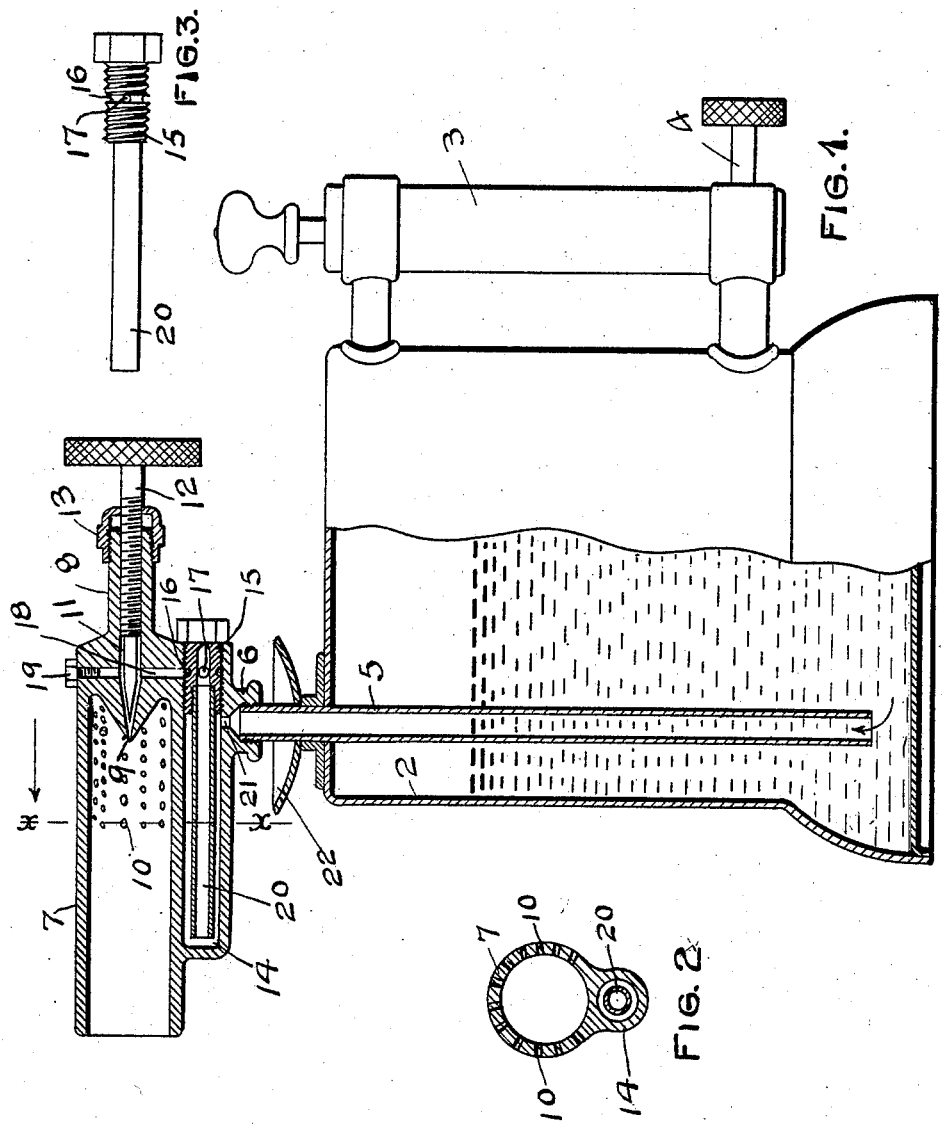

EMIL GUSTAFSON, OF CHICAGO, ILLINOIS.

BLOWPIPE.

SPECIFICATION forming part of Letters Patent No. 654,566, dated July 24, 1900.

Application filed July 3, 1899. Serial No. 722,643. (No model.)

*To all whom it may concern:*

Be it known that I, EMIL GUSTAFSON, of Chicago, Cook county, Illinois, have invented certain new and useful Improvements in Blowpipes, of which the following is a specification.

My invention relates to that class of blowpipes wherein the oil used for fuel is vaporized before passing to the burner; and the object of the invention is to provide improved means for effecting the vaporization of the oil, to the end that the blowpipe may be rendered ready for use within a very short space of time, a regular and uniform flame produced, and the efficiency of the apparatus greatly increased.

The invention consists generally in various constructions and combinations, all as hereinafter described, and particularly pointed out in the claims.

In the accompanying drawings, forming part of this specification, Figure 1 is a partial vertical section of a blowpipe embodying my invention. Fig. 2 is a sectional view on the line $x\ x$ of Fig. 1. Fig. 3 is a detail of the plug fitting within the retort-chamber.

In the drawings, 2 represents the oil-reservoir, of any preferred shape and size, provided on one side with the pump 3, having a suitable connection at its lower end with the interior of the reservoir, and a valve 4 for closing the passage between the pump and reservoir when the desired pressure has been established therein. A pipe 5, having its lower end near the bottom of the reservoir, projects through an opening in the top of the same and is threaded at its upper end to receive a nipple 6 on the burner 7, which is preferably cylindrical in form, having a closed end provided on the outside with a stem 8 and on the inside with a conical tip 9, surrounded by a series of perforations 10 in the wall of the burner. The stem 8 is provided with a longitudinal hole or opening 11, tapered at its inner end and extending through the conical tip 9 and terminating in a pinpoint opening therein. A valve 12, having a tapered end, fits within the hole 11 and is provided with a threaded shank to enter a threaded opening in a cap 13 on the end of said stem.

Upon the under side of the burner and preferably integral therewith is a substantially-cylindrical chamber 14, forming a retort wherein the oil is vaporized on its way from the reservoir to the burner-tip. In one end of said chamber I have provided a removable plug 15, having a hollow threaded shank fitting within the interiorly-threaded end of said chamber. An annular groove 16 is provided in the surface of said shank, communicating with its hollow interior and with said chamber through a port or passage 17. A duct 18 leads from said annular groove to the hole or opening 11, and a continuation of said duct is preferably provided in the end of said burner upon the opposite side of said hole or opening 11, through which access may be had to the duct 18 for cleansing purposes. This continuation or extension of said duct 18 is closed at its outer end by a removable plug 19. Within the chamber 14 I provide a tube 20, supported at one end within a socket in the shank of said plug 15, and a space is provided between said tube and the walls of the chamber to permit the oil flowing therein to circulate freely through the chamber, and in order that the oil may enter said chamber from the pipe 5 I provide a port 21 in the wall of the chamber, preferably near the end of the hollow plug 15 and communicating with the nipple 6. Beneath said chamber, on the pipe 5, I may provide a cup 22, wherein a small quantity of oil may be placed and lighted to heat the chamber and burner and start vaporization of the oil. As the vapor passes up to the burner-tip and is ignited the flame of the blowpipe will subject the chamber 14 to an intense heat and forming a retort thereof will cause rapid vaporization of the oil flowing therein, and the vapor entering the open end of the tube 20 will pass through the port 17 to the annular groove 16 and duct 17 and thence to the burner-tip. Should the retort-chamber or the tube 20 become filled with sediment, the same may be readily cleaned out by removing the plug 15, and access may be had at any time to the duct 18 for cleansing purposes through its extension or continuation at the top of the burner.

I do not wish to be confined to the relative positions of the burner and retort-chamber, nor to the particular arrangement of the duct and passages therein, as the same may be varied in many ways without departing from the spirit of my invention.

Having thus described my invention, I claim as new and desire to secure by Letters Patent—

1. In a burner for blowpipes, a retort-chamber formed integrally therewith and provided with an oil-inlet port, a plug having a hollow shank fitting within said chamber and provided with an annular groove in its exterior surface, a tube arranged within said chamber and having one end fitting within said hollow shank, a port provided in said shank and communicating with said groove and the interior of said chamber through said tube, and a duct communicating with said groove and the burner-tip, substantially as described.

2. The combination, with a burner, of an integral retort thereon, said retort having an oil-inlet port and an open end, a plug fitting said open end, said plug having a hollow shank provided with a port in its walls communicating with its interior, a duct communicating with said port and with the burner-tip, and a tube provided within said retort having one end fitting within said shank and its opposite inlet end being remote from said oil-inlet whereby the oil and vapor are forced to travel a considerable distance before entering the duct leading to said burner, substantially as described.

In witness whereof I have hereunto set my hand this 24th day of June, 1899.

EMIL GUSTAFSON.

In presence of—
JOHN HINCH,
FRED HENRICHS.